United States Patent
Wakamatsu et al.

(10) Patent No.: US 12,436,526 B2
(45) Date of Patent: Oct. 7, 2025

(54) CONTROL DATA EXTRACTION AND EVALUATION OF PRODUCTION SYSTEM

(71) Applicant: KABUSHIKI KAISHA YASKAWA DENKI, Kitakyushu (JP)

(72) Inventors: Tsuyoshi Wakamatsu, Fukuoka (JP); Tomoyuki Nakamura, Fukuoka (JP); Mitsuaki Nakanishi, Fukuoka (JP)

(*) Notice: Subject to any disclaimer, the term of this patent is extended or adjusted under 35 U.S.C. 154(b) by 739 days.

(21) Appl. No.: 17/752,861

(22) Filed: May 25, 2022

(65) Prior Publication Data

US 2022/0291670 A1 Sep. 15, 2022

Related U.S. Application Data

(63) Continuation of application No. PCT/JP2019/046456, filed on Nov. 27, 2019.

(51) Int. Cl.
G05B 19/418 (2006.01)
B25J 9/16 (2006.01)

(52) U.S. Cl.
CPC ....... *G05B 19/41875* (2013.01); *B25J 9/1674* (2013.01); *G05B 19/4183* (2013.01); *G05B 2219/32366* (2013.01)

(58) Field of Classification Search
None
See application file for complete search history.

(56) References Cited

U.S. PATENT DOCUMENTS

| | | | |
|---|---|---|---|
| 6,801,822 | B1 | 10/2004 | Fujiwara et al. |
| 8,862,259 | B2 | 10/2014 | Kobayashi |
| 9,128,481 | B2 | 9/2015 | Wechter et al. |
| 2005/0007056 | A1 | 1/2005 | Yamamoto et al. |
| 2005/0159835 | A1 | 7/2005 | Yamada et al. |
| 2007/0093930 | A1 | 4/2007 | Griggs et al. |
| 2009/0021205 | A1 | 1/2009 | Cullen |
| 2009/0089231 | A1 | 4/2009 | Baier et al. |
| 2014/0200703 | A1 | 7/2014 | Ideguchi et al. |
| 2017/0268960 | A1 | 9/2017 | Jaramillo-Velasques et al. |

(Continued)

FOREIGN PATENT DOCUMENTS

| | | |
|---|---|---|
| CN | 103921274 | 7/2014 |
| CN | 107003665 | 8/2017 |

(Continued)

OTHER PUBLICATIONS

Extended Search Report in corresponding European Application No. 19954374.5 dated Jul. 12, 2023.

(Continued)

*Primary Examiner* — Paul D Lee
(74) *Attorney, Agent, or Firm* — SOEI PATENT & LAW FIRM

(57) ABSTRACT

An information collection device comprising circuitry configured to: accumulate, in a database, a control signal of a local device having a motor, the local device being a part of a production system of one or more workpieces, the control signal including internal information of the local device generated during operation of a plurality of processes; extract a signal set accumulated during one process of the plurality of processes from the control signal accumulated in the database based on a predetermined extraction condition; and generate an evaluation result of the one process based on the signal set.

20 Claims, 20 Drawing Sheets

(56) References Cited

U.S. PATENT DOCUMENTS

| | | | |
|---|---|---|---|
| 2018/0107197 A1* | 4/2018 | Tanaka | G05B 19/4097 |
| 2019/0018390 A1 | 1/2019 | Bitterolf et al. | |
| 2019/0049939 A1 | 2/2019 | Kato et al. | |
| 2020/0183375 A1* | 6/2020 | Inoue | G05B 23/0227 |
| 2021/0055708 A1 | 2/2021 | Handa et al. | |
| 2021/0157301 A1* | 5/2021 | Nagata | G05B 19/4183 |

FOREIGN PATENT DOCUMENTS

| | | |
|---|---|---|
| JP | H8-240452 | 9/1996 |
| JP | 2002-117107 | 4/2002 |
| JP | 2009-169458 | 7/2009 |
| JP | 2010-198447 | 9/2010 |
| JP | 2019-036075 | 3/2019 |
| JP | 2019-160067 | 9/2019 |
| JP | 2020-149531 | 9/2020 |
| WO | 2016/026558 | 2/2016 |
| WO | 2019/176699 | 9/2019 |

OTHER PUBLICATIONS

Office Action issued in Japanese Patent Application No. P2021-171963, dated Aug. 1, 2023 (with English partial translation).
International Search Report dated Jan. 28, 2020 for PCT/JP2019/046456.
International Preliminary Report on Patentability with Written Opinion dated Jun. 9, 2022 for PCT/JP2019/046456.
Office Action issued in Taiwanese Patent Application No. 109141525, dated Feb. 6, 2024 (with English partial translation).
Office Action issued in Chinese Patent Application No. 201980102508.3, dated Dec. 27, 2024 (with English partial translation).
Office Action issued in Chinese Patent Application No. 201980102508.3 dated Jul. 1, 2025 (with English partial translation).

* cited by examiner

Fig. 4

| TIME | MOTOR 1 | | | | | | |
|---|---|---|---|---|---|---|---|
| | POSITION COMMAND SIGNAL | SPEED COMMAND SIGNAL | POSITION SIGNAL | SPEED SIGNAL | VOLTAGE SIGNAL | CURRENT SIGNAL | ... |
| | | | | | | | |
| | | | | | | | |
| | | | | | | | |
| | | | | | | | |
| | | | | | | | |
| | | | | | | | |
| ... | | | | | | | |

| JOB | STEP | TYPE | SERIAL NO. | START TIME | END TIME |
|---|---|---|---|---|---|
| | | | | | |
| | | | | | |
| | | | | | |
| | | | | | |
| | | | | | |
| | | | | | |
| | | | | | |

| TYPE | SERIAL NO. | INSPECTION TIME | INSPECTION RESULT |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |

Fig.7

| INSPECTION TIME | TYPE | SERIAL NO. | STEP 1 EVALUATION | ... | STEP N EVALUATION | OPERATION EVALUATION | INSPECTION RESULT |
|---|---|---|---|---|---|---|---|
| | | | | | | | |
| | | | | | | | |
| | | | | | | | |
| | | | | | | | |
| | | | | | | | |
| | | | | | | | |
| | | | | | | | |

Fig. 8

| ANALYSIS TIME | START TIME | END TIME | JOB | STEP 1 EVALUATION | ... | STEP N EVALUATION | OPERATION EVALUATION |
|---|---|---|---|---|---|---|---|
| | | | | | | | |
| | | | | | | | |
| | | | | | | | |
| | | | | | | | |
| | | | | | | | |
| | | | | | | | |

Fig. 9

| INSPECTION TIME | TYPE | SERIAL NO. | JOB | STEP 1 EVALUATION | ... | STEP N EVALUATION | OPERATION EVALUATION | INSPECTION RESULT |
|---|---|---|---|---|---|---|---|---|
| | | | | | | | | |
| | | | | | | | | |
| | | | | | | | | |
| | | | | | | | | |
| | | | | | | | | |
| | | | | | | | | |

*Fig.10A*

| INSPECTION TIME | MODEL | SERIAL NO. | OPERATION EVALUATION | INSPECTION RESULT |
|---|---|---|---|---|
| | | | | |
| | | | | |
| | | | | |
| | | | | |
| | | | | |
| | | | | |
| | | | | |
| | | | | |

*Fig.10B*

| STEP | START TIME | END TIME | EVALUATION |
|---|---|---|---|
| | | | |
| | | | |
| | | | |
| | | | |
| | | | |
| | | | |
| | | | |
| | | | |

CONTROL DATA EXTRACTION AND EVALUATION OF PRODUCTION SYSTEM

CROSS-REFERENCE TO RELATED APPLICATIONS

This application is a continuation application of PCT Application No. PCT/JP2019/046456 filed on Nov. 27, 2019, the entire contents of which are incorporated herein by reference.

BACKGROUND

Field

Japanese Unexamined Patent Publication No. 2019-36075 discloses a production equipment data processing device that includes a reference-data acquiring unit configured to acquire, in production equipment, reference data including information concerning time in which a reference for grouping of data operates, a target-data acquiring unit configured to acquire target data concerning a state of the production equipment detected by detectors provided in the production equipment, and a combined-data generating unit configured to generate, for each group of the reference data, combined data for each group obtained by combining, with the reference data, data detected in the same period of time as an operation period of time of the reference data in the target data.

SUMMARY

Disclosed herein is an information collection device is disclosed herein. The information collection device may comprise circuitry configured to: accumulate, in a database, a control signal of a local device having a motor, the local device being a part of a production system of one or more workpieces, the control signal including internal information of the local device generated during operation of a plurality of processes; extract a signal set accumulated during one process of the plurality of processes from the control signal accumulated in the database based on a predetermined extraction condition; and generate an evaluation result of the one process based on the signal set.

Additionally, an information collection method is disclosed herein. The method may comprise: accumulating, in a database, a control signal of a local device having a motor, the local device being a part of a production system of one or more workpieces, the control signal including internal information of the local device generated during operation of a plurality of processes; extracting a signal set accumulated during one process of the plurality of processes from the control signal accumulated in the database based on a predetermined extraction condition; and generating an evaluation result of the one process based on the signal set.

Additionally, a non-transitory memory device is disclosed herein. The memory device has instructions stored thereon that, in response to execution by a processing device, cause the processing device to perform operations. The operations may comprise: accumulating, in a database, a control signal of a local device having a motor, the local device being a part of a production system of one or more workpieces, the control signal including internal information of the local device generated during operation of a plurality of processes; extracting a signal set accumulated during one process of the plurality of processes from the control signal accumulated in the database based on a predetermined extraction condition; and generating an evaluation result of the one process based on the signal set.

BRIEF DESCRIPTION OF THE DRAWINGS

FIG. 4 is a table illustrating an example time information.

FIG. 5 is a table illustrating an example workpiece information.

FIG. 6 is a table illustrating an example quality information.

FIG. 7 is a schematic diagram illustrating an example list screen.

FIG. 8 is a schematic diagram illustrating a modification of the list screen.

FIG. 9 is a schematic diagram illustrating another modification of the list screen.

FIGS. 10A and 10B are diagrams illustrating other modifications of the list screen.

DETAILED DESCRIPTION

Production System

Figure 1:
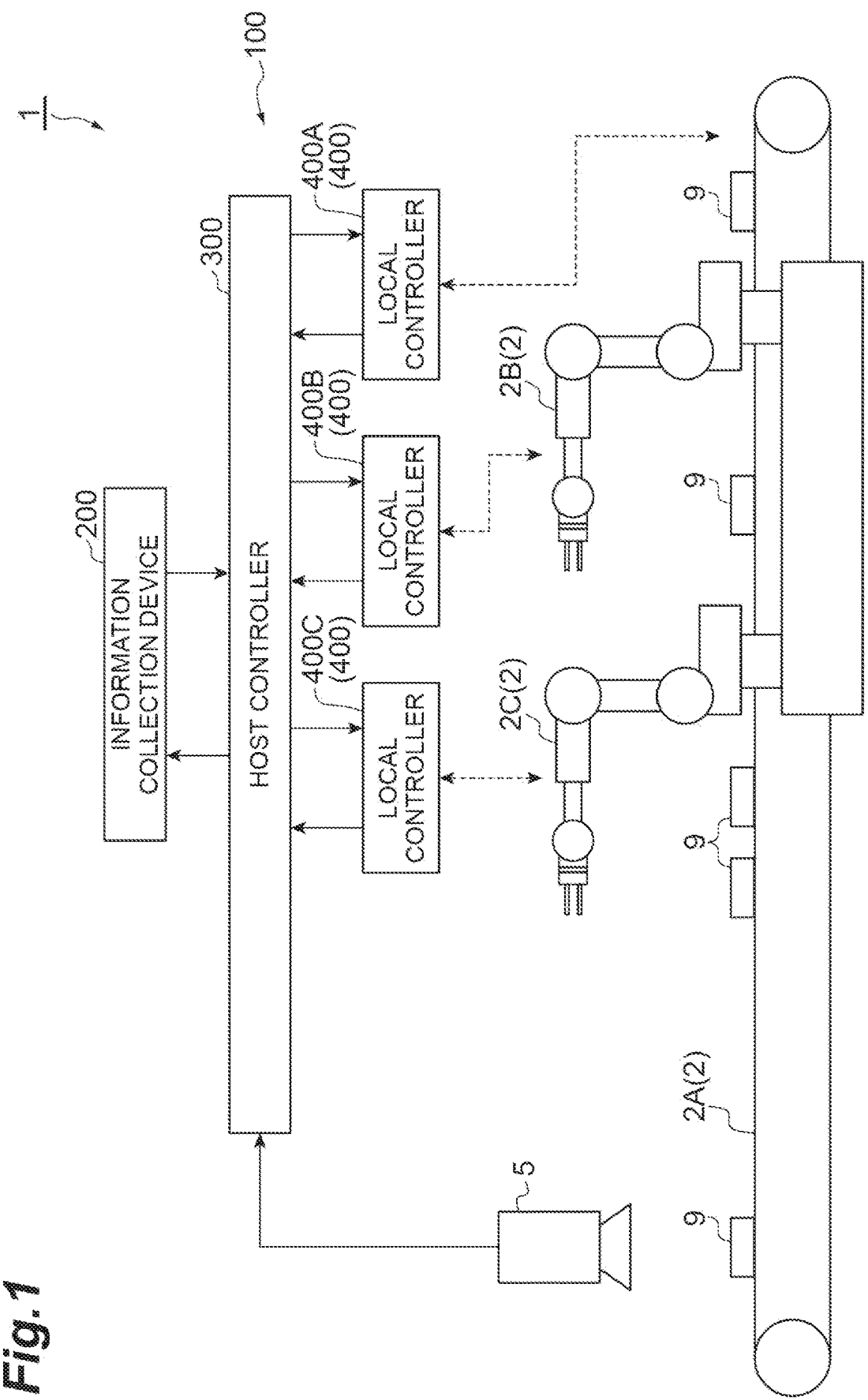
FIG. 1 is a schematic diagram illustrating an example configuration of a production system.

A production system 1 illustrated in FIG. 1 is a system for producing workpieces by cooperative operation of a plurality of local devices. Hereinafter, all objects to be worked by each local device in the production process of workpieces will be referred to as "workpiece(s)". For example, a "workpiece" includes a final product in the production system 1, a component of the final product, and a unit obtained by combining a plurality of components.

The cooperative operation represents that the plurality of local devices operate to share a plurality of processes for obtaining at least one final product. The plurality of local devices may operate so as to share the plurality of processes for obtaining one final product for each process, or may operate so as to share the plurality of processes for obtaining a plurality of final products for each final product.

The production system 1 includes a plurality of local devices 2 and a control system 100. The local devices 2 are devices that directly perform work on a workpiece 9 in a production site of the workpiece 9. A direct work is a work of applying some energy such as heat energy, kinetic energy, or potential energy to the workpiece 9. At least one of the local devices 2 includes at least one servomotor. For example, the plurality of local devices 2 includes at least a robot (at least one local device 2 is a robot).

The local devices 2 illustrated in FIG. 1 include, but are not limited to, a conveying device 2A and robots 2B and 2C. As long as at least any one of the local devices 2 includes at least one servomotor, the number and type of the local devices 2 can be changed.

The conveying device 2A conveys the workpiece 9 by using, for example, an electric servomotor or the like as a power source. Examples of the conveying device 2A include a belt conveyor and a roller conveyor. The robots 2B and 2C perform work on the workpiece 9 conveyed by the conveying device 2A. Examples of the work performed on the workpiece 9 include installing of another workpiece 9 (for example, a sub-part) to the workpiece 9 conveyed by the conveying device 2A (for example, a base part), and fastening (for example, bolt fastening) and joining (for example, welding) of parts in the workpiece 9 conveyed by the conveying device 2A.

Figure 2:
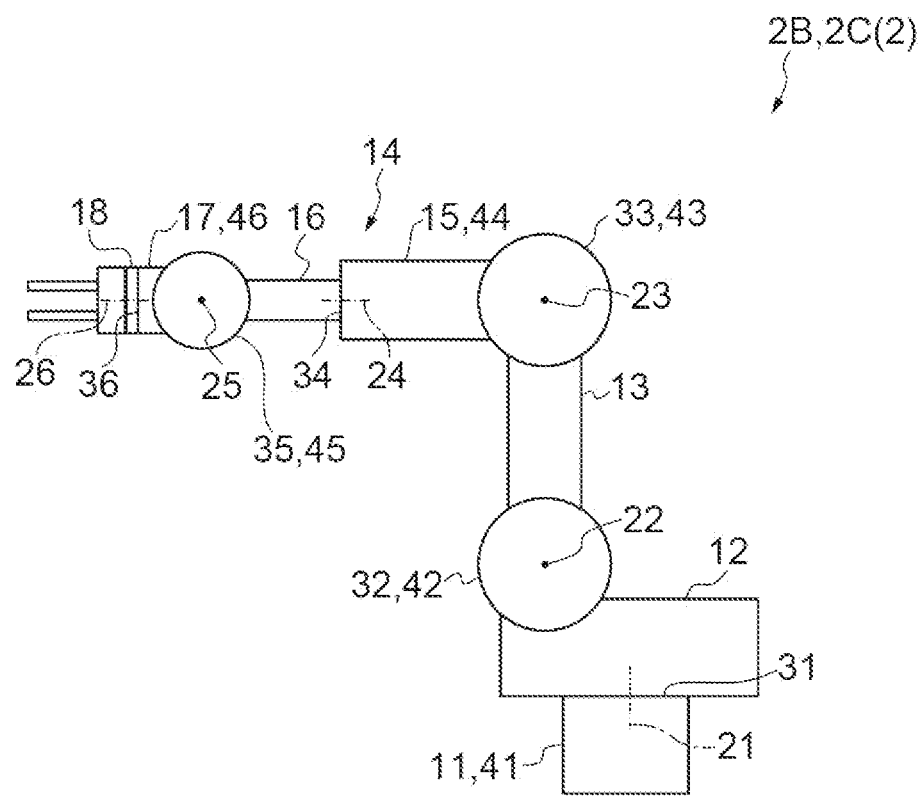
FIG. 2 is a schematic diagram illustrating an example configuration of a robot.

For example, the robot 2B and 2C are six-axis vertical articulated robots, and as illustrated in FIG. 2, have a base 11, a turning part 12, a first arm 13, a second arm 14, a third arm 17, a tip 18, and actuators 41, 42, 43, 44, 45, and 46. The base 11 is installed around the conveying device 2A. The turning part 12 is provided on the base 11 so as to turn around a vertical axis 21. The first arm 13 is connected to the turning part 12 so as to swing around an axis 22 that intersects (for example, is orthogonal to) the axis 21. Intersecting includes a case of a twisted relationship such as a so-called three-dimensional intersection. The second arm 14 is connected to the tip of the first arm 13 so as to swing around an axis 23 substantially parallel to the axis 22. The second arm 14 includes an arm base 15 and an arm end 16. The arm base 15 is connected to the tip of the first arm 13 and extends along an axis 24 that intersects (for example, is orthogonal to) the axis 23. The arm end 16 is connected to the tip of the arm base 15 so as to turn around the axis 24. The third arm 17 is connected to the tip of the arm end 16 so as to swing around an axis 25 that intersects (for example, is orthogonal to) the axis 24. The tip 18 is connected to the tip of the third arm 17 so as to turn around an axis 26 that intersects (for example, is orthogonal to) the axis 25.

As described above, a robot 10 includes a joint 31 connecting the base 11 and the turning part 12, a joint 32 connecting the turning part 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip 18.

The actuators 41, 42, 43, 44, 45, and 46 include, for example, an electric servomotor and a speed reducer, and drive the joints 31, 32, 33, 34, 35, and 36, respectively. For example, the actuators 41, 42, 43, 44, 45 rotates the turning part 12 around the axis 21, swings the first arm 13 around the axis 22, swings the second arm 14 around the axis 23, rotates the arm end 16 around the axis 24, swings the third arm 17 around the axis 25, and rotates the tip 18 around the axis 26.

The configurations of the robots 2B and 2C can be changed. For example, the robots 2B and the 2C may be a seven-axis redundant robot in which a joint of one axis is further added to the six-axis vertical articulated robot, or may be a so-called Selective Compliance Assembly Robot Arm (SCARA) articulated robot.

The production system 1 may further include an inspection device 5. The inspection device 5 inspects quality of the workpiece 9. Examples of the inspection device 5 include a camera that inspects appearance of the workpiece 9. The inspection device 5 may be a sensor that inspects size or the like of the workpiece 9 by laser light or the like. The production system 1 may include a plurality of inspection devices 5.

Control System

The control system 100 includes a host controller 300, a plurality of a local controllers 400, and an information collection device 200. The local controllers 400 respectively control the local device 2. For example, the local controller 400 acquires an operation command of the local device 2 to be controlled, and causes the operation of the local device 2 to follow the operation command.

For example, the local controller 400 generates a local command signal for a motor of the local device 2 based on the operation command, acquires a feedback signal from the motor, and controls the motor based on the local command signal and the feedback signal. For example, the local controller 400 outputs driving power to the motor so as to reduce a deviation between the local command signal and the feedback signal. The local controller 400 may generate a plurality of local command signals for one motor, acquire a plurality of feedback signals from one motor, and control one motor based on the local command signals and the feedback signals.

Examples of the local command signal include a position command signal indicating a position target value (for example, a rotation angle target value), a speed command signal indicating a speed target value (for example, an angular speed target value) and the like. Examples of the feedback signal include a position signal indicating a detection value of a position, a speed signal indicating a detection value of a speed, a current signal indicating a command value or a detection value of an output current, and a voltage signal indicating a command value or a detection value of an output voltage.

When the local device 2 has a plurality of motors, the local controller 400 generates one or more local command signals for each motor, acquires one or more feedback signals from each motor, and controls each of the plurality of motors.

In FIG. 1, the control system 100 has three local controllers 400A, 400B, and 400C. The local controller 400A controls the conveying device 2A. The local controller 400B controls the robot 2B. The local controller 400C controls a robot 2C. The number of the local controller 400 and the configuration of each the local controller 400 can be changed in accordance with the number of the local devices 2 and the type of each local device 2.

The host controller 300 outputs operation commands to the local controllers 400, and acquires status information from the local controllers 400. The status information includes one or more of the local command signals and one or more of the feedback signals. The host controller 300 acquires inspection result of the workpiece 9 from the inspection device 5. Examples of the host controller 300 include a programmable logic controller that operates in accordance with a ladder program.

The information collection device 200 is configured to execute: accumulating, in a database, a control signal of the local devices 2, the control signal being internal information during operation including a plurality of processes; extracting a signal set accumulated during any one process of the plurality of processes from the control signal accumulated in the database; and evaluating the extracted signal set to generate evaluation information representing an evaluation result of the signal set. The internal information is information generated and/or acquired in a closed control loop between the local controller 400 and the local device 2 to be controlled. For example, the control signal includes one or more local command signals described above and one or more feedback signals.

The information collection device 200 acquires control signals from the local controllers 400 by wired communication or wireless communication. As an example, the information collection device 200 can communicate with the host controller 300 by wired communication or wireless communication, and acquires control signals from the local controllers 400 via the host controller 300.

Figure 3:
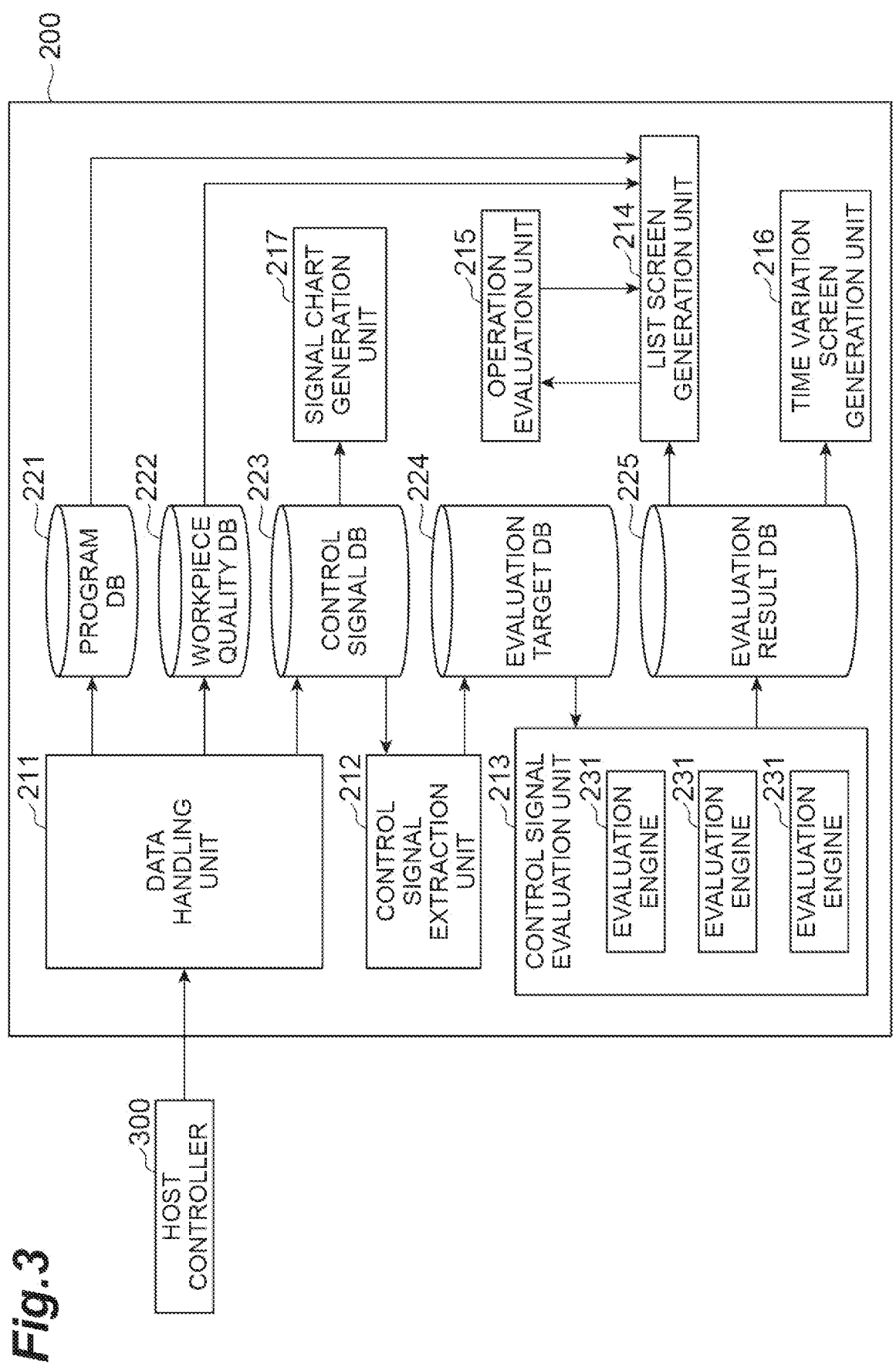
FIG. 3 is a block diagram illustrating an example functional configuration of an information collection device.

As illustrated in FIG. 3, for example, the information collection device 200 includes a data handling unit 211, a control signal extraction unit 212, a control signal evaluation unit 213, and a list screen generation unit 214 as functional configurations (hereinafter referred to as a "functional block"). Since these functional blocks are components of the information collection device 200, the processing executed by each functional block is the processing executed by the information collection device 200.

The data handling unit 211 acquires the control signal of the local devices 2 from the local controllers 400, and accumulates it in a database. The data handling unit 211 may further accumulate time information on the operation time of the local devices 2 in the database. For example, as illustrated in FIG. 4, the data handling unit 211 accumulates a position command signal, a speed command signal, a position signal, a speed signal, a voltage signal, a current signal, and the like of each motor in a control signal database 223 in association with time. The data handling unit 211 acquires time information based on the time measured by a timer of the information collection device 200 (a system timer 297 described later), for example. The data handling unit 211 may acquire the time information from the host controller 300 or the local controller 400.

The data handling unit 211 may further store program information on a program for operating the local devices 2 (hereinafter referred to as an "operation program") in the database. The operation program includes a plurality of job programs. The program information includes, for example, identification information of the local device 2 to be controlled and identification information of each job program. The job program is a program representing one set of work of the local device 2. Examples of one set of work include conveyance of the workpiece 9 along a series of paths, welding of the workpiece 9 along a series of welding lines, painting of the workpiece 9 along a series of painting lines, and the like.

For example, as illustrated in FIG. 5, the data handling unit 211 accumulates identification information of a job program ("JOB" in the drawing), a start time, and an end time in association with one another in a program database 221. The job program may include two or more processes in time series. In this case, the data handling unit 211 further associates identification information of the process ("STEP" in the drawing) with identification information of the job program, associates a start time and an end time with each process, and accumulates them in the program database 221.

When the job program includes two or more processes, the plurality of processes are grouped into a plurality of groups by job information on the job program (for example, identification information of the job program). Each group includes two or more processes belonging to an identical job program. Accordingly, accumulating the identification information of the job program and the identification information of the process in association with each other in the program database 221 is an example of further accumulating the grouping information including the job information in the database. The grouping information is information for grouping a plurality of processes into two or more processes belonging to one set of work.

The data handling unit 211 may further accumulate the workpiece information on the workpiece 9 in the database. For example, as illustrated in FIG. 5, the data handling unit 211 further accumulates, in the program database 221, the type of the workpiece 9 ("TYPE" in the drawing) and the individual identification information of the workpiece 9 ("SERIAL NO." in the drawing) with the identification information of the job and the identification information of the process in association with each other.

When the workpiece 9 is produced by the operation of the local device 2 including two or more processes, the individual identification information of the workpiece 9 is associated with the identification information of the two or more processes. In this case, the plurality of processes are grouped into a plurality of groups also by the workpiece information. Each group includes two or more processes for an identical workpiece. Accordingly, accumulating the individual identification information of the workpiece 9 and the identification information of the process in association with each other in the program database 221 is an example of further storing the grouping information including the workpiece information in the database.

Figure 6:
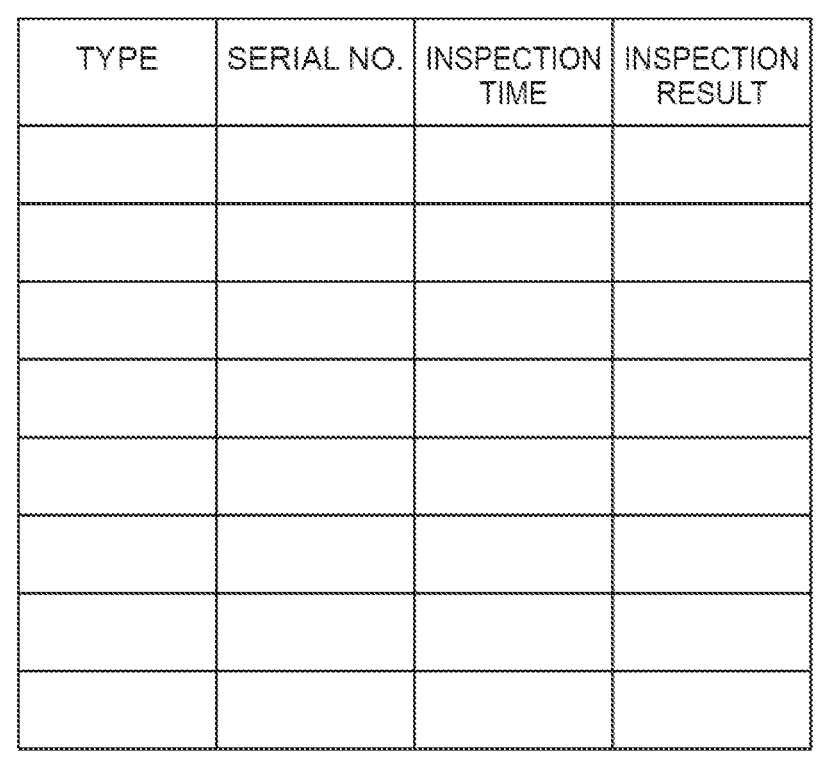

The data handling unit 211 may further accumulate quality information representing the inspection result of the quality of the workpiece 9 in the database. For example, as illustrated in FIG. 6, the data handling unit 211 accumulates the type of the workpiece 9, the individual identification information of the workpiece 9, the inspection time by the inspection device 5, and the inspection result by the inspection device 5 in a workpiece quality database 222 in association with one another. The inspection time by the inspection device 5 may be a time at which the program database 221 acquires the inspection result by the inspection device 5.

Returning to FIG. 3, the control signal extraction unit 212 extracts a signal set accumulated during any one process of the plurality of processes from the control signal accumulated in the control signal database 223. The control signal extraction unit 212 may extract the signal set based on the time information. The control signal extraction unit 212 may extract the signal set based on program information. For example, the control signal extraction unit 212 acquires the start time and the end time of the one process from the program database 221, and extracts a signal set from the acquired start time to the end time from the control signal database 223.

Time information may not be used as a parameter to extract the control signal. For example, when the program database 221 and the control signal database 223 are collected in one database, the control signal extraction unit 212 may extract the signal set of the one process based on the identification information of the one process.

The control signal extraction unit 212 may extract the signal set based on the workpiece information. For example, the control signal extraction unit 212 acquires the start time and the end time of the process associated with the individual identification information of the workpiece 9 from the program database 221, and extracts the signal set from the acquired start time to the end time from the control signal database 223.

Also in this case, the time information may not be used as a parameter to extract the control signal. For example, when the program database 221 and the control signal database 223 are collected in one database, the control signal extraction unit 212 may extract the signal set of the process corresponding to the workpiece 9 based on the individual identification information of the workpiece 9.

The control signal extraction unit 212 may back-calculate the start time and the end time of the process corresponding to the workpiece 9 from the inspection time of the workpiece 9 in the workpiece quality database 222, and extract the signal set from the back-calculated start time to the end time from the control signal database 223. The control signal extraction unit 212 stores the extracted signal set in an evaluation target database 224.

The control signal extraction unit 212 may repeatedly extract the signal set based on an extraction condition specifying an identical process, and accumulate the extracted signal set in the evaluation target database 224. For example, the control signal extraction unit 212 may repeatedly extract, based on a process condition specifying an identification information of the process, the signal set of a process in which the identification information of the process satisfies the process condition. The control signal extraction unit 212 may repeatedly extract, based on a workpiece condition specifying a type of the workpiece 9, the signal set of the process in which the type of the workpiece 9 satisfies the workpiece condition.

The control signal extraction unit 212 may repeatedly extract the signal set based on an extraction condition specifying a process that is an identical process and executed in an identical time period. For example, the control signal extraction unit 212 may repeatedly extract, based on a process condition specifying the identification information of the process and a time condition specifying a time zone, the signal set of the process in which the identification information of the process satisfies the process condition and the start time and the end time satisfy the time condition. The control signal extraction unit 212 may repeatedly extract, based on the workpiece condition specifying the type of the workpiece 9 and the time condition specifying the time zone, the signal set of the process in which the type of the workpiece 9 satisfies the workpiece condition and the start time and the end time satisfy the time condition.

For example, the control signal extraction unit 212 may repeatedly extract, based on the process condition specifying the identification information of the process and the time condition specifying the time zone, the signal set of the process in which the identification information of the process satisfies the process condition and the start time and the end time satisfy the time condition. The control signal extraction unit 212 may repeatedly extract the signal set based on an extraction condition specifying a process that is the same process and executed in the same time period.

The control signal extraction unit 212 may extract two or more signal sets respectively corresponding to two or more processes belonging to an identical group as a signal set of the identical group based on the grouping information, and store the extracted signal sets in the evaluation target database 224. For example, the control signal extraction unit 212 may extract, based on at least the workpiece information, two or more signal sets respectively corresponding to two or more processes for an identical workpiece as the signal set of the identical group. The control signal extraction unit 212 may extract, based on at least the job information, two or more signal sets respectively corresponding to two or more processes belonging to an identical job as the signal set of the same group.

The control signal evaluation unit 213 evaluates the signal set extracted by the control signal extraction unit 212 and generates evaluated information indicating the evaluated result. Examples of the evaluation of the signal set include comparison evaluation between the magnitude of the signal set (hereinafter referred to as a "signal level") and a predetermined reference level. In this case, the evaluation information may be information indicating whether the signal level exceeds the reference level, or may be information indicating whether the signal level is below the reference level. The evaluation information may be information indicating a difference between the signal level and the reference level.

The control signal evaluation unit 213 may generate evaluation information of an evaluation target signal set extracted by the control signal extraction unit 212 based on the evaluation target signal set and at least one comparison target signal set that was previously extracted by the control signal extraction unit 212. In this case, the evaluation information may be information indicating a difference between the signal level of the evaluation target signal set and the signal level of the comparison target signal set (hereinafter referred to as "abnormality"), information indicating whether the abnormality exceeds a predetermined reference divergence level, or information indicating whether the abnormality is below the reference divergence level.

The control signal evaluation unit 213 may select, based on an extraction condition of the signal set, one of a plurality of types of evaluation engines 231 that output evaluation information in response to input of a signal set and generate the evaluation information based on the signal set and the selected evaluation engine. Although three the evaluation engine 231 are illustrated in the drawing, the number of evaluation engines is not limited thereto.

Examples of the plurality of types of the evaluation engines 231 include a plurality of the evaluation engines 231 having different reference levels, and a plurality of the evaluation engines 231 having different reference divergence levels. One evaluation engine 231 may be an engine that compares the signal level of the signal set with the reference level, and another evaluation engine 231 may be an engine that compares the signal level of the evaluation target signal set with the signal level of the comparison target signal set.

The control signal evaluation unit 213 stores the generated evaluation information in an evaluation result database 225 in association with identification information of the job program, identification information of the process, a type of the workpiece 9, individual identification information of the workpiece 9, and the like. As described above, when the control signal extraction unit 212 repeatedly extracts a signal set based on the extraction condition, the control signal evaluation unit 213 may evaluate a plurality of signal sets repeatedly extracted by the control signal extraction unit 212, generate a plurality of evaluation information items respectively representing the evaluated results (hereinafter referred to as "evaluation information to be traced"), and accumulate the plurality of evaluation information items in the evaluation result database 225.

The control signal evaluation unit 213 may evaluate each of the signal set of the identical group extracted by the control signal extraction unit 212, generate a plurality of pieces of evaluation information respectively representing the evaluated results (hereinafter referred to as "evaluation information of the identical group"), and accumulate the pieces of evaluation information in the evaluation result database 225.

The list screen generation unit 214 generates a list screen for displaying the evaluation information of the identical group accumulated in the evaluation result database 225 for each group, and displays the list screen on a display device or the like. The list screen generation unit 214 may further generate a quality list screen for displaying the quality information accumulated in the workpiece quality database 222 for each the workpiece 9, and display the quality list screen on the display device or the like.

The list screen generation unit 214 may generate the list screen and the quality list screen to be displayed in one screen as illustrated in FIG. 7, FIG. 8, and FIG. 9. On a screen in FIG. 7, in each row, the inspection time of the workpiece 9, the type of the workpiece 9, the individual identification information of the workpiece 9, the evaluation information ("STEP 1 EVALUATION", " . . . ", and "STEP N EVALUATION" in the drawing) of the identical group (a group corresponding to the workpiece 9), and the inspection result are associated with one another.

On a screen in FIG. 8, in each row, the generation time of evaluation information ("ANALYSIS TIME" in the drawing), the start time of executing the job program ("START TIME" in the drawing), the end time of executing the job program ("END TIME" in the drawing), identification information of the job program ("JOB" in the drawing), and evaluation information ("STEP 1 EVALUATION", " . . . ", "STEP N EVALUATION" in the drawing) of the identical group (a group corresponding to the job program) are associated with one another.

On a screen in FIG. 9, in each row, the inspection time of the workpiece 9, the type of the workpiece 9, the individual identification information of the workpiece 9, the identification information of the job program, and the evaluation information of the identical group (a group corresponding to the job program) are associated with one another.

As described above, in a case where the control signal evaluation unit 213 accumulates the evaluation information to be traced in the evaluation result database 225, the list screen generation unit 214 may perform highlighted display for visually recognizing which workpiece or job program is the evaluation information to be traced in the list screen.

Returning to FIG. 2, the information collection device 200 may further include an operation evaluation unit 215. The operation evaluation unit 215 generates operation evaluation information representing the evaluation result of the operation of the local device 2 corresponding to the group based on the evaluation information of the signal set of the identical group accumulated in the evaluation result database 225. For example, the evaluation result database 225 performs statistical processing on the evaluation information of the signal set of the identical group to generate the operation evaluation information. For example, the evaluation result database 225 generates a mean value, a maximum value, a minimum value, and the like of the evaluation information of the signal set of the identical group as the operation evaluation information.

If the information collection device 200 includes the operation evaluation unit 215, the list screen generation unit 214 may generate a list screen for displaying operation evaluation information for each group (see FIG. 7, FIG. 8, and FIG. 9).

As illustrated in FIG. 10A, the list screen generation unit 214 may generate a list screen that displays an operation evaluation information for each group without displaying the evaluation information of the identical group. In this case, the list screen generation unit 214 may generate a list screen (see FIG. 10B) that displays the evaluation information of the identical group in response to selection of any group on the screen of FIG. 10A.

Figure 11:
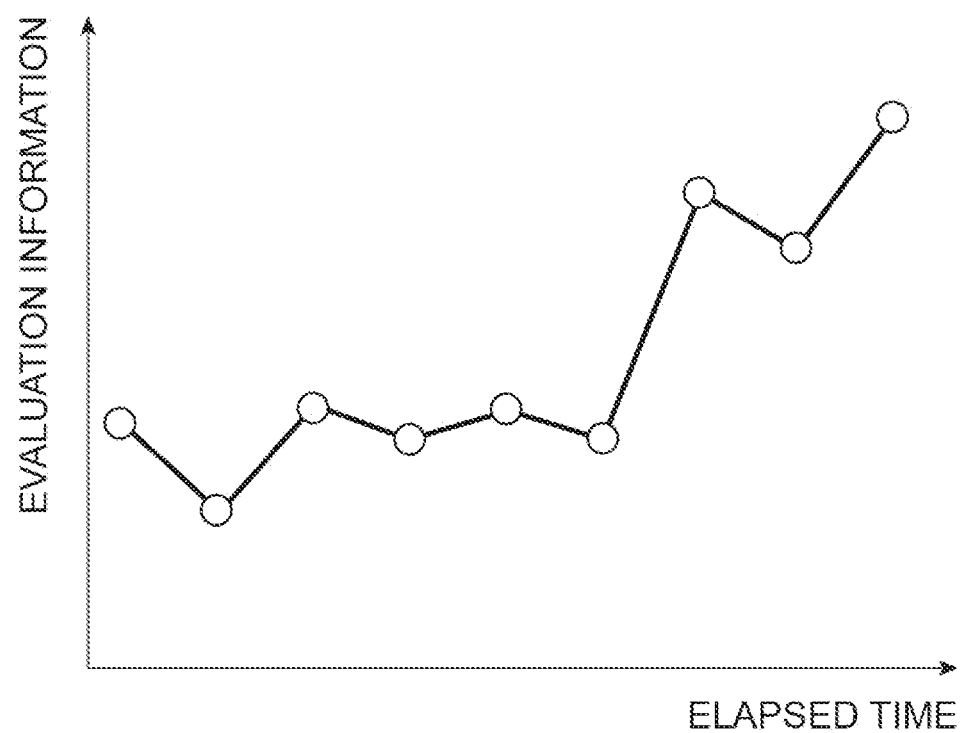
FIG. 11 is a graph illustrating an example time variation screen.

In a case where the control signal evaluation unit 213 generates the above described evaluation information to be traced and accumulates it in the evaluation result database 225, the information collection device 200 may further include a time variation screen generation unit 216. The time variation screen generation unit 216 generates, based on the evaluation information to be traced, a time variation screen representing a time variation in the evaluation information and displays the screen on a display device or the like. The generation and display of the time variation screen are executed, for example, in response to an operation (for example, a click operation of a mouse) being performed on a predetermined portion in the screen of any one of FIGS. 7 to 9, FIG. 10A, and FIG. 10B. FIG. 11 is a graph illustrating the time variation screen. The horizontal axis of the graph represents elapsed time, and the vertical axis of the graph represents the magnitude of the evaluation information.

Figure 12:
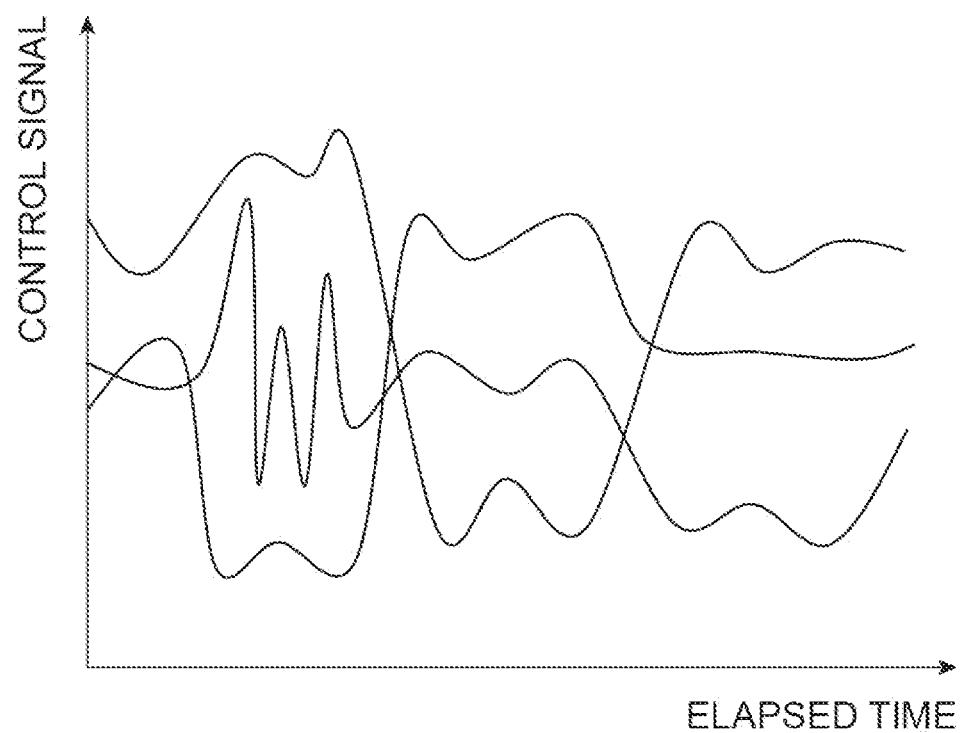
FIG. 12 is a graph illustrating an example signal chart.

The information collection device 200 may further include a signal chart generation unit 217. The signal chart generation unit 217 generates a signal chart screen representing a time variation of the control signal in a period designated by the user, and displays the signal chart screen on a display device or the like. For example, when one inspection time is selected in FIG. 7, the signal chart generation unit 217 generates a signal chart screen in a period from a time earlier than the inspection time by a predetermined period to the inspection time. When the identification information of any job program is selected in FIG. 8, the signal chart generation unit 217 generates a signal chart screen in a period from the start time to the end time of the job program. The generation and displaying of the signal chart screen are executed in response to an operation (for example, a click operation of a mouse) being performed on a predetermined portion in the screen of any one of FIGS. 7 to 9, FIG. 10A, and FIG. 10B, for example. FIG. 12 is a graph illustrating the signal chart screen. The horizontal axis of the graph represents elapsed time, and the vertical axis of the graph represents the magnitude of the control signal.

The configuration of the information collection device 200 described above is merely an example and can be changed. For example, the information collection device 200 may be configured to periodically generate and accumulate evaluation information, or may be configured to generate evaluation information each time a list screen is displayed. The information collection device 200 may be configured to automatically generate an assessment report conforming to ISO9001 or the like based on the assessment information accumulated in the evaluation result database 225.

Figure 13:
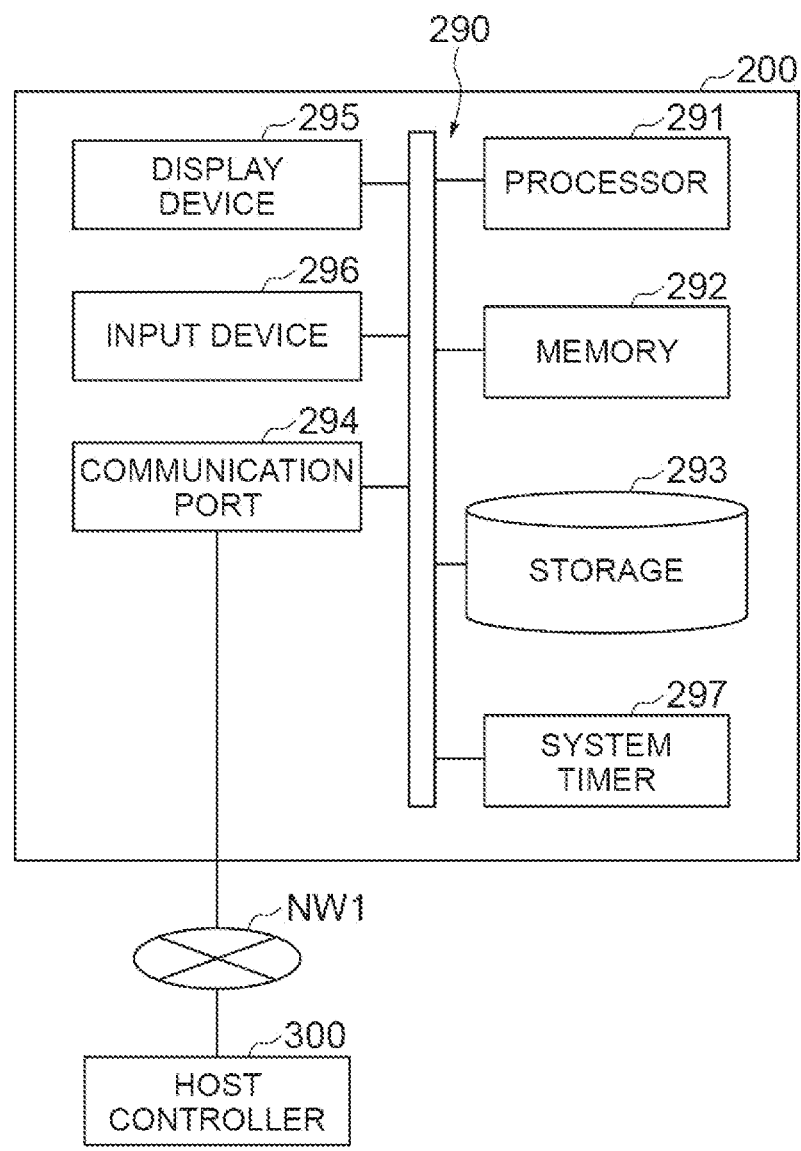
FIG. 13 is a block diagram illustrating an example hardware configuration of the information collection device.

FIG. 13 is a block diagram illustrating an example hardware configuration of the information collection device 200. As illustrated in FIG. 13, the information collection device 200 includes at least one processor 291, a memory 292, storage 293, a communication port 294, a display device 295, an input device 296, and a system timer 297. The storage 293 includes a computer-readable storage medium, such as a hard disk. The storage medium may be a removable medium such as a nonvolatile semiconductor memory, a magnetic disk, or an optical disk. The storage 293 stores a program for causing a device to execute: accumulating, in a database, a control signal that is internal information of a local device having a servomotor during operation including a plurality of processes; extracting a signal set accumulated during any one process of the plurality of processes from the control signal accumulated in the database; and evaluating the signal set extracted by the control signal extraction unit 212 to generate evaluation information representing an evaluated result. For example, the storage 293 stores a program for configuring each functional block of the information collection device 200 described above.

The memory 292 temporarily stores the program loaded from the storage 293 and the calculation result by the processor 291. The processor 291 configures each functional block described above by executing the program in cooperation with the memory 292. The communication port 294 communicates with the host controller 300 via a network NW1 in accordance with a command from the processor 291.

The display device 295 and the input device 296 function as user interfaces of the information collection device 200. The display device 295 includes, for example, a liquid crystal monitor, and is used for displaying information to the user. The input device 296 is, for example, a keypad or the like, and acquires input information by the user. The display device 295 and the input device 296 may be integrated like a so-called touch panel. The display device 295 and the input device 296 may be incorporated in the information collection device 200 or may be provided in an external device connected to the information collection device 200. The system timer 297 measures the elapsed time by counting, for example, a reference clock pulse of a constant cycle.

Information Collection Procedure

Next, an example information collection procedure executed by the information collection device 200 will be described as an example of the information collection method. This procedure includes storing, in a database, a control signal, which is internal information of a local device including a servomotor during operation including a plurality of processes, extracting a signal set stored during any one process of the plurality of processes from the control signal stored in the database, and evaluating the extracted signal set by a control signal extraction unit to generate evaluation information representing the evaluated result. Hereinafter, the example information collection procedure will be described in detail by being divided into a "signal accumulation procedure", a "signal evaluation procedure", a "list screen generation procedure", a "time variation screen generation procedure", and a "signal chart screen generation procedure".

Signal Accumulation Procedure

Figure 14:
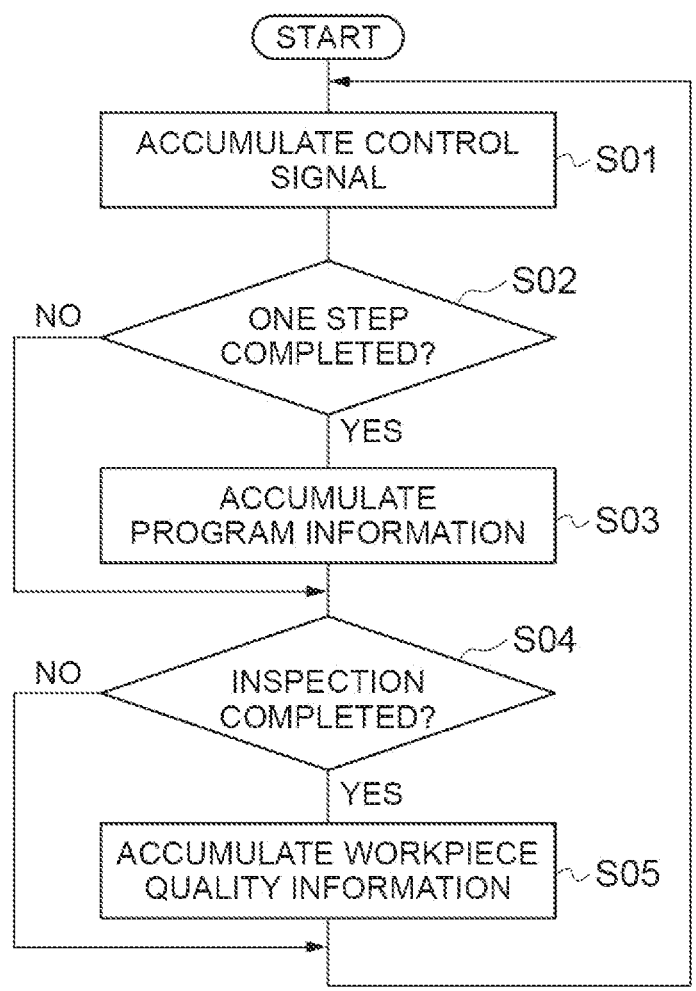
FIG. 14 is a flowchart illustrating an example signal accumulation procedure.

The signal accumulation procedure is a procedure for accumulating the control signal and the quality information of the workpiece 9. As illustrated in FIG. 14, the information collection device 200 first executes operations S01 and S02. In the operation S01, the data handling unit 211 acquires control signals of the local device 2 from a plurality of the local controllers 400, and accumulates the acquired control signals in the control signal database 223. In a operation S02, the data handling unit 211 checks whether the one step of the operation program is completed.

If it is determined in the operation S02 that the one step of the operation program is completed, the information collection device 200 executes a operation S03. In the operation S03, the data handling unit 211 accumulates the program information of the completed step in the program database 221.

Next, the information collection device 200 executes a operation S04. If it is determined in the operation S02 that the one step of the operation program is not completed, the information collection device 200 executes the operation S04 without executing the operation S03. In the operation S04, the data handling unit 211 checks whether the inspection by the inspection device 5 is completed.

If it is determined in the operation S04 that the inspection is completed, the information collection device 200 executes a operation S05. In the operation S05, the data handling unit 211 acquires the inspection result of the quality of the workpiece 9 from the host controller 300 or the like and accumulates the inspection result in the workpiece quality database 222. Thereafter, the information collection device 200 returns the processing to the operation S01. If it is determined in the operation S04 that the inspection is not completed, the information collection device 200 returns the processing to the operation S01 without executing the operation S05. The information collection device 200 repeats the above processing. Thus, the control signal is accumulated in the control signal database 223, and the inspection result of the quality of the workpiece 9 is accumulated in the workpiece quality database 222.

Signal Evaluation Procedure

Figure 15:
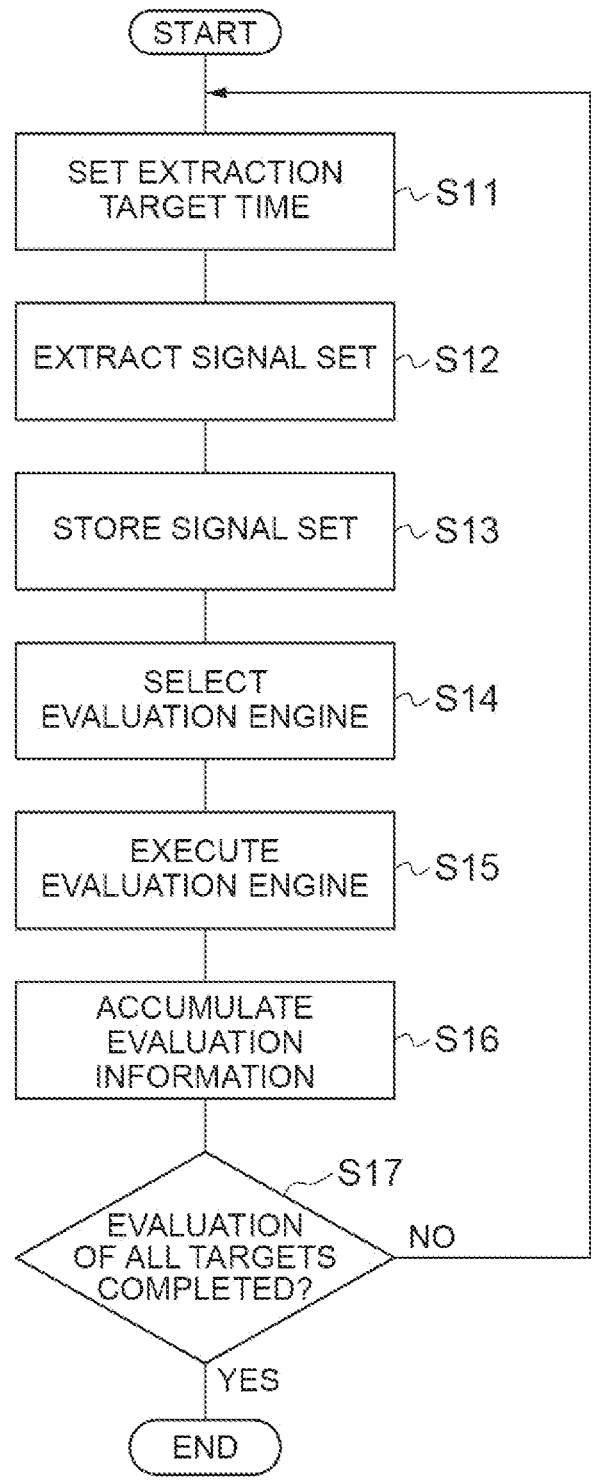
FIG. 15 is a flowchart illustrating an example signal evaluation procedure.

The signal evaluating procedure is a procedure for evaluating the control signal database 223 signal accumulated in the control unit for each process. As illustrated in FIG. 15, the information collection device 200 first executes operations S11, S12, S13, S14, and S15. In the operation S11, the control signal extraction unit 212 sets a time at which the control signal is to be extracted. For example, the control signal extraction unit 212 acquires the start time and the end time of the step satisfying the extraction condition from the program database 221. In the operation S12, the control signal extraction unit 212 extracts a signal set from the acquired start time to the end time from the control signal database 223. In the operation S13, the control signal extraction unit 212 stores the extracted signal set in the evaluation target database 224.

In the operation S14, the control signal evaluation unit 213 selects one of the plurality of types of the evaluation engines 231 based on the extraction condition of the signal set by the control signal extraction unit 212. In the operation S15, the control signal evaluation unit 213 generates the evaluation information based on the signal set extracted by the control signal extraction unit 212 and the selected evaluation engine 231.

Figure 16:
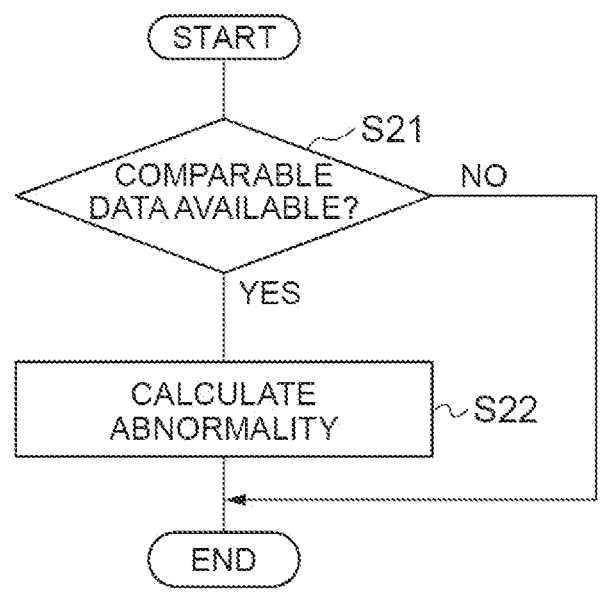
FIG. 16 is a flowchart illustrating an example generation procedure of evaluation information.

In a case where the selected the evaluation engine 231 is an engine that compares the signal level of the evaluation target signal set and the signal level of the comparison target signal set, the control signal evaluation unit 213 executes, for example, a operation S21 in FIG. 16. In the operation S21, the control signal evaluation unit 213 checks whether a predetermined number of comparison target signal sets are accumulated in the evaluation target database 224.

If it is determined in the operation S11 that the predetermined number of comparison target signal sets are accumulated, the information collection device 200 executes a operation S22. In the operation S22, the control signal evaluation unit 213 calculates the difference between the signal level of the evaluation target signal set and the signal level of the comparison target signal set as the abnormality. If it is determined in the operation S21 that the predetermined number of comparison target signal sets are not accumulated, the information collection device 200 completes the evaluation of the signal set without executing the operation S22.

Returning to FIG. 15, the information collection device 200 then executes operations S16 and S17. In the operation S16, the control signal evaluation unit 213 accumulates evaluation information in the evaluation result database 225. In the operation S17, the control signal extraction unit 212 checks whether evaluation of all the processes satisfying the extraction condition is completed.

If it is determined in the operation S17 that a process for which evaluation has not been completed remains, the information collection device 200 returns the processing to the operation S11. Thereafter, extraction and evaluation of the signal set are repeated until evaluation of all the processes satisfying the extraction condition is completed.

If it is determined in the operation S17 that all the processes have been evaluated, the information collection device 200 completes the signal evaluating procedure. The information collection device 200 periodically repeats the above signal evaluating procedure.

Generation Procedure of List Screen

Figure 17:
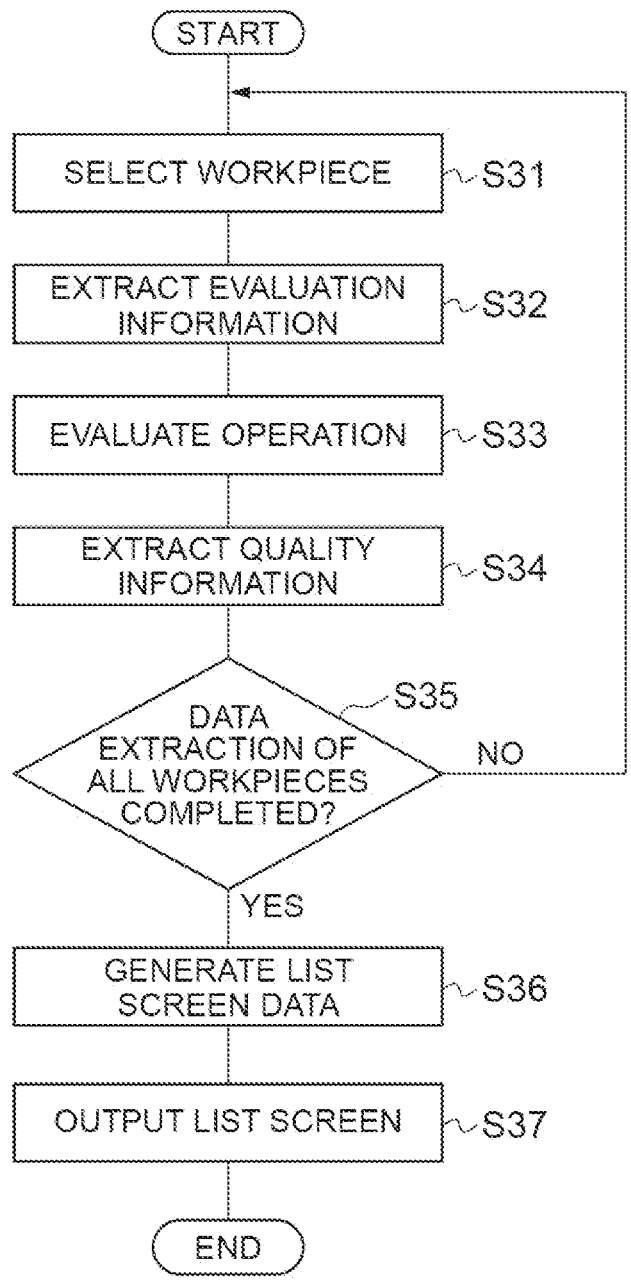
FIG. 17 is a flowchart illustrating an example generation procedure of the list screen.

As illustrated in FIG. 17, the information collection device 200 first executes operations S31, S32, S33, S34, and S35. In the operation S31, the list screen generation unit 214 selects a workpiece 9 in the evaluation result database 225. Hereinafter, the selected the workpiece 9 is referred to as an "evaluation target workpiece". In the operation S32, the list screen generation unit 214 extracts all the evaluation information corresponding to the evaluation target workpiece from the evaluation result database 225. In the operation S33, the operation evaluation unit 215 generates operation evaluation information of the local device 2 corresponding to the evaluation target workpiece based on the evaluation information extracted by the list screen generation unit 214.

In the operation S34, the list screen generation unit 214 acquires the inspection result of the quality of the evaluation target workpiece from the workpiece quality database 222. In the operation S35, the list screen generation unit 214 checks whether data extraction of all the workpiece 9 is completed.

If it is determined in the operation S35 that a workpiece 9 for which data extraction is not completed, the information collection device 200 returns the processing to the operation S31. Thereafter, the selection and extraction of the workpiece 9 are repeated until the extraction of all the workpiece 9 is completed.

When it is determined in the operation S35 that the data extraction of all the workpiece 9 is completed, the information collection device 200 executes operations S36 and S37. In the operation S36, the list screen generation unit 214 generates a list screen based on the workpiece 9. In a operation S37, the list screen generation unit 214 outputs the list screen to the display device or the like. Thus, the generation procedure of the list screen is completed. With this procedure, for example, the list screen of FIG. 7 is displayed.

Figure 18:
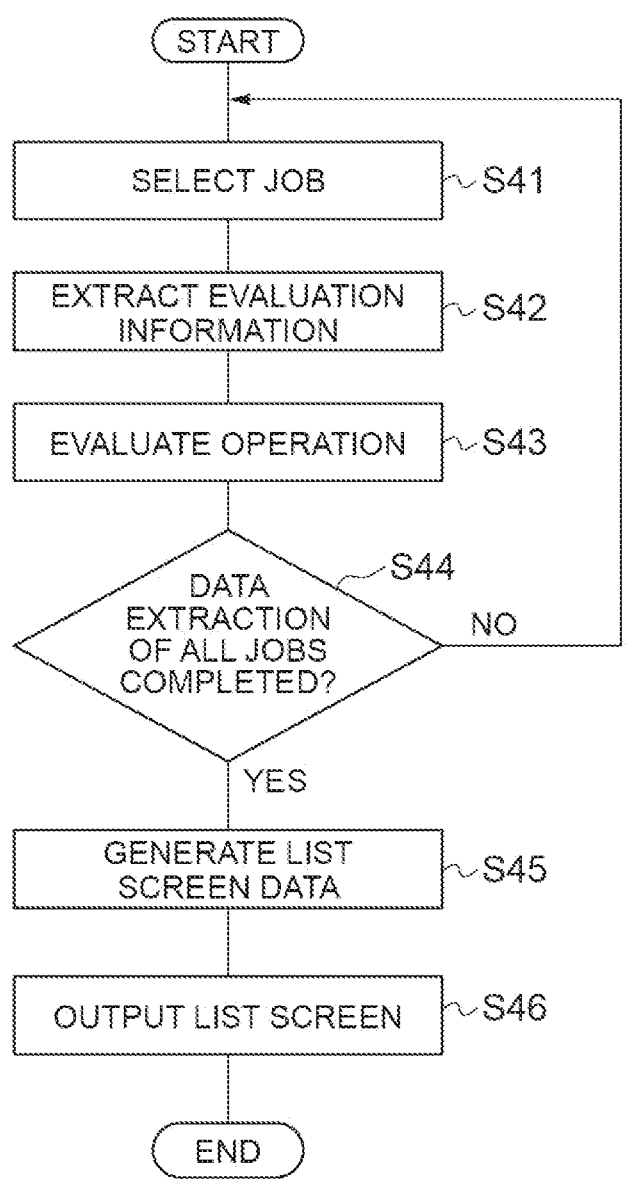
FIG. 18 is a flowchart illustrating a modification of the generation procedure of the list screen.

FIG. 18 is a flowchart illustrating a modification of the generation procedure of the list screen. As illustrated in FIG. 18, the information collection device 200 first executes operations S41, S42, S43, and S44. In the operation S41, the list screen generation unit 214 selects a job program in the evaluation result database 225. Hereinafter, the selected job program is referred to as "evaluation target job". In the operation S42, the list screen generation unit 214 extracts all the evaluation information corresponding to the evaluation target job from the evaluation result database 225.

In the operation S43, the operation evaluation unit 215 generates the operation evaluation information of the evaluation target job based on the evaluation information extracted by the list screen generation unit 214. In the operation S44, the list screen generation unit 214 checks whether data extraction of all job programs is completed.

If it is determined in the operation S44 that a job program for which data extraction is not completed remains, the information collection device 200 returns the processing to the operation S41. Thereafter, the selection of the job program and the data extraction are repeated until the data extraction of all the job programs is completed.

When it is determined in the operation S44 that data extraction of all job programs is completed, the information collection device 200 executes operations S45 and S46. In the operation S45, the list screen generation unit 214 generates a list screen based on the job program. In the operation S46, the list screen generation unit 214 outputs the list screen to a display device or the like. Thus, the generation procedure of the list screen is completed. With this procedure, for example, the list screen in FIG. 8 is displayed.

Generation Procedure of Time Variation Screen

Figure 19:
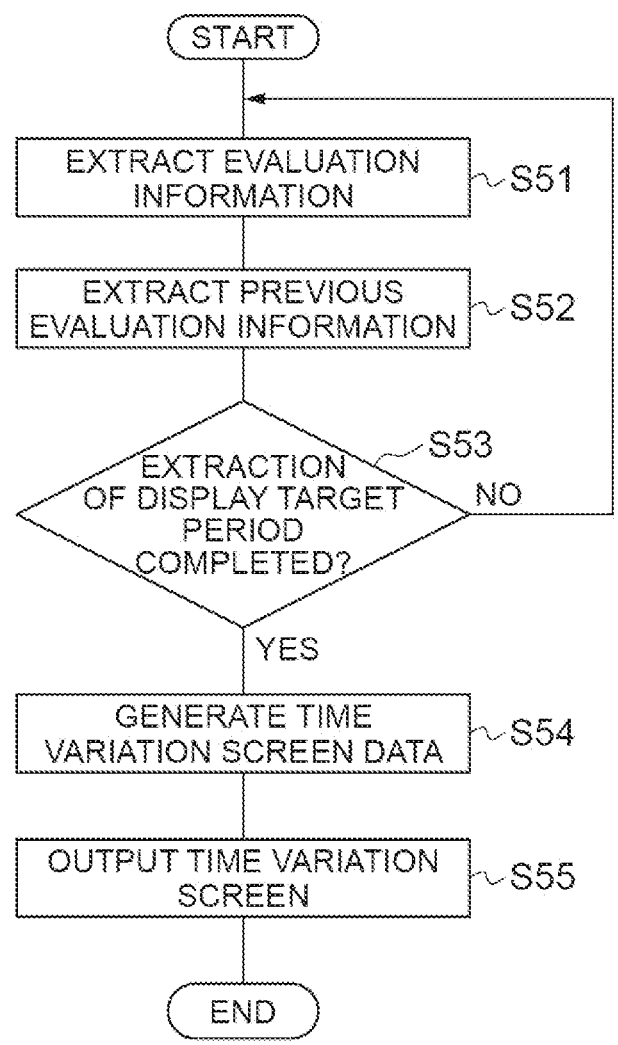
FIG. 19 is a flowchart illustrating an example generation procedure of the time variation screen.

As illustrated in FIG. 19, the information collection device 200 first executes operations S51, S52, and S53. In the operation S51, the time variation screen generation unit 216 extracts the latest evaluation information among the evaluation information to be traced from the evaluation result database 225. In the operation S52, the time variation screen generation unit 216 extracts, from the evaluation result database 225, evaluation information that is older by one than the evaluation information extracted immediately before among the evaluation information to be traced. In a operation S53, the time variation screen generation unit 216 checks whether extraction of evaluation information in a preset display target period has been completed.

If it is determined in the operation S53 that the extraction of the evaluation information in the display target period is not completed, the information collection device 200 returns the processing to the operation S52. Thereafter, the extraction of the past evaluation information is repeated until the extraction of the evaluation information in the display target period is completed.

If it is determined in the operation S53 that the extraction of the evaluation information in the display target period is completed, the information collection device 200 executes operations S54 and S55. In the operation S54, the time variation screen generation unit 216 generates a time variation screen of the extracted plurality of pieces of evaluation information. In the operation S55, the time variation screen generation unit 216 outputs the time variation screen to the display device or the like. Thus, the generation procedure of the time variation screen is completed. With this procedure, for example, a time variation screen in FIG. 11 is displayed.

Generation Procedure of Signal Chart Screen

Figure 20:
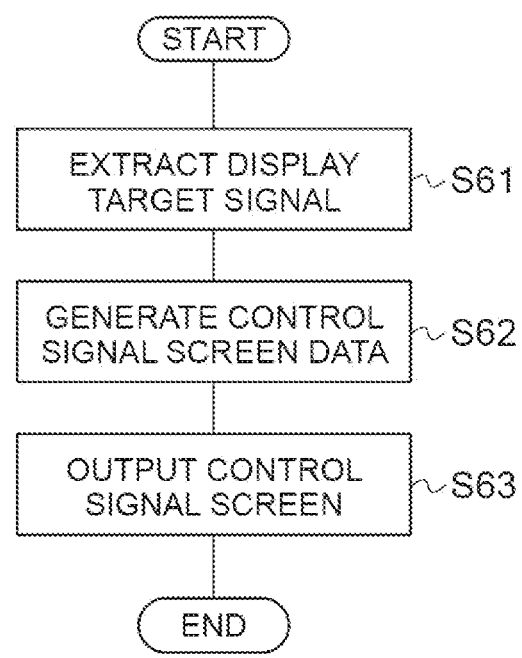
FIG. 20 is a flowchart illustrating an example generation procedure of the signal chart screen.

As illustrated in FIG. 20, the information collection device 200 executes operations S61, S62, and S63. In the operation S61, the signal chart generation unit 217 extracts the control signal in the period designated by the user from the control signal database 223. In the operation S62, the signal chart generation unit 217 generates data of a signal chart screen of the extracted control signal. In a operation S63, the signal chart generation unit 217 outputs the signal chart screen to a display device or the like. Thus, the generation procedure of the signal chart screen is completed. By this procedure, for example, the signal chart screen in FIG. 12 is displayed.

As described above, the information collection device 200 of the production system 1 includes: the data handling unit 211 that accumulates, in a database, a control signal of the local device 2 having a motor, the control signal being internal information during operation including a plurality of processes; the control signal extraction unit 212 that extracts a signal set accumulated during any one process of the plurality of processes from the control signal accumulated in the database; and the control signal evaluation unit 213 that evaluates the signal set extracted by the control signal extraction unit 212 and generates evaluated information representing the evaluated result of the signal set.

With the information collection device 200, evaluation of the control signal and accumulation of the evaluation information can be executed process by process. The evaluation information accumulated process by process, for example, may be used to facilitate a comparison of the evaluation information between the identical processes. Accordingly, the condition of the local device may be grasped at an early stage.

The data handling unit 211 may further accumulate time, in the database, time information about an operation time of the local device 2, and the control signal extraction unit 212 may extract the signal set based on the time information. Accordingly, accumulation of the time information may be used to facilitate extraction of the signal set.

The data handling unit 211 may further accumulate, in the database, program information on a program for operating the local device 2, and the control signal extraction unit 212 may extract the signal set based on the program information. Accordingly, the program information that defines the operation of the local device 2 may be used to facilitate extraction of the signal set.

The data handling unit 211 may accumulate, in the database, workpiece information on the workpiece 9 produced by the local device 2, and the control signal extraction unit 212 may extract the signal set based on the workpiece information. Accordingly, the workpiece information may be used to facilitate extraction of the signal of the process corresponding to the workpiece 9.

The control signal evaluation unit 213 may select, based on an extraction condition of the signal set, one of a plurality of types of the evaluation engines 231 each of which outputs evaluation information in response to input of the signal set and generate the evaluation information based on the signal set and the selected the evaluation engine 231. Accordingly, the signal set can be evaluated by selectively using a plurality of types of the local device 2 in accordance with the operation of the evaluation engine 231, for example.

The control signal extraction unit 212 may repeatedly extract a signal set based on an extraction condition specifying an identical process, and the control signal evaluation unit 213 may generate evaluation information of the evaluation target signal set extracted by the control signal extraction unit 212 based on the evaluation target signal set and at least one comparison target signal set extracted by the control signal extraction unit 212 in the past. Accordingly, the abnormality of the signal set may be evaluated with reliability by evaluating the signal set by comparison with the signal set of the identical process in the past.

The control signal extraction unit 212 may repeatedly extract a signal set based on an extraction condition specifying an identical process, the control signal evaluation unit 213 may evaluate a plurality of signal sets repeatedly extracted by the control signal extraction unit 212 to generate a plurality of pieces of evaluation information respectively indicating evaluated results of the signal sets, and accumulate the evaluation information in a database, and the information collection device 200 of the production system 1 may further include the time variation screen generation unit 216 that generates a time variation screen representing a time variation of the evaluation information based on the plurality of pieces of evaluation information accumulated in the database. Accordingly, the evaluation information at an early stage may be grasped by displaying the time variation of the evaluation information.

The data handling unit 211 may further accumulate, in the database, grouping information for grouping a plurality of processes into two or more processes belonging to one set of works, the control signal extraction unit 212 may extract, based on the group information, two or more signal sets respectively corresponding to the two or more processes belonging to the identical group as a signal set of the identical group, the control signal evaluation unit 213 may evaluate each of the signal sets of the identical group and accumulate evaluation information in the database, and the information collection device 200 of the production system 1 may further include: the operation evaluation unit 215 that generates, based on the evaluation information of the signal sets of the identical group accumulated in the database, operation evaluation information representing an evaluation result of an operation of the local device corresponding to the group; and the list screen generation unit 214 that generates a list screen for displaying the operation evaluation information for each group. Accordingly, by integrating the evaluation information of two or more processes in each group into one operation evaluation information, a list screen that facilitates grasping the general condition of the local device 2 may be displayed.

The data handling unit 211 may further accumulate, in the database, grouping information for grouping a plurality of processes into two or more processes belonging to one set of work, the control signal extraction unit 212 may extract, based on the grouping information, two or more signal sets respectively corresponding to the two or more processes belonging to the identical group as a signal set of the identical group, the control signal evaluation unit 213 may evaluate each of the signal sets of the same group and accumulate the evaluation information in the database, and the information collection device 200 of the production system 1 may further include the list screen generation unit 214 that generates a list screen for displaying the respective evaluation information of the signal sets of the same group accumulated in the database for each group. Accordingly, by grouping the evaluation information of a plurality of processes for each set of work, a list screen that facilitates finding a process whose evaluation information should be grasped maybe displayed.

The data handling unit 211 may accumulate, in the database, grouping information including workpiece information on the workpiece 9 produced by an operation of the local device 2 including two or more processes, and the control signal extraction unit 212 may extract, based on at least the workpiece information, two or more signal sets respectively corresponding to the two or more processes for an identical workpiece as the signal set of the identical group. Accordingly, grouping can be performed based on the workpiece information.

The data handling unit 211 may further accumulate, in the database, quality information representing an inspection result of quality of the workpiece 9, and the list screen generation unit 214 may further generate a quality list screen for displaying the quality information for each workpiece. Accordingly, by further generating the quality list screen, it is easier to find a process for which evaluation information should be grasped.

The data handling unit 211 may accumulate, in the database, the grouping information including job information on a plurality of job programs including two or more processes of the local device 2, and the control signal extraction unit 212 may extract, based on at least the job information, two or more signal sets respectively corresponding to the two or more processes belonging to an identical job program as the signal set of the identical group. Accordingly, grouping can be performed further based on the job information.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. An information collection device comprising circuitry configured to:
    accumulate, in a database, a control signal of a local device having a motor, the local device being a part of a production system of one or more workpieces, the control signal including internal information of the local device generated during operation of a plurality of processes;
    accumulate, in the database, program information on a program for operating the local device to execute the plurality of processes;
    identify a part of the program corresponding to one process of the plurality of processes based on a predetermined extraction condition and the program information;
    extract from the control signal accumulated in the database, a signal set that is accumulated during the one process of the plurality of processes and that is associated with the part of the program in the database; and
    generate an evaluation result of the one process based on the signal set.

2. The information collection device according to claim 1, wherein the circuitry is configured to:
    accumulate, in the database, time information on an operation time of the local device; and
    extract the signal set based on the time information and the extraction condition.

3. The information collection device according to claim 2, wherein the circuitry is configured to:
    identify a start time and an end time of the one process based on the extraction condition and the time information; and
    extract the signal set that is accumulated during a period from the start time to the end time.

4. The information collection device according to claim 1, wherein the circuitry is configured to:
    accumulate, in the database, time information on an operation time of the local device;
    identify a start time and an end time of the part of the program based on the program information and the time information; and
    extract the signal set that is accumulated during a period from the start time to the end time.

5. The information collection device according to claim 1, wherein the circuitry is configured to:
    accumulate, in the database, workpiece information on one or more workpieces produced by the local device during execution of the plurality of processes; and
    extract the signal set based on the workpiece information and the extraction condition.

6. The information collection device according to claim 5, wherein the circuitry is configured to:
    identify one workpiece corresponding to the one process based on the extraction condition and the workpiece information; and
    extract the signal set that is associated with the one workpiece in the database.

7. The information collection device according to claim 6, wherein the circuitry is further configured to:
    identify the part of the program corresponding to the one workpiece based on the extraction condition, the workpiece information, and the program information; and
    extract the signal set that is associated with the part of the program in the database.

8. The information collection device according to claim 7, wherein the circuitry is configured to:
    accumulate, in the database, time information on an operation time of the local device;
    identify a start time and an end time of the part of the program based on the program information and the time information; and
    extract the signal set that is accumulated during a period from the start time to the end time.

9. The information collection device according to claim 1, wherein the circuitry is configured to:
    select, based on the extraction condition, one of a plurality of evaluation engines having different criterions, each of the plurality of evaluation engines being configured to output the evaluation result in response to input of the signal set according to a criterion; and
    generate the evaluation result based on the signal set and the selected evaluation engine.

10. The information collection device according to claim 1, wherein the circuitry is configured to:
    repeatedly extract the signal set based on the extraction condition designating an identical process repeatedly executed in the plurality of processes; and
    generate the evaluation result based on a comparison between the signal set and one or more previously extracted signal sets.

11. The information collection device according to claim 10, wherein the circuitry is configured to:
    generate evaluation results of the identical process based on repeatedly extracted signal sets; and
    generate a time variation screen representing a time variation of the evaluation results.

12. The information collection device according to claim 1, wherein the circuitry is configured to:
    accumulate, in the database, grouping information for grouping the plurality of processes into one or more groups each of which include two or more processes;
    extract, based on the grouping information, two or more signal sets for each of the one or more groups;
    generate evaluation results of the two or more processes based on the two or more signal sets for each of the one or more groups;
    accumulate the evaluation results in the database;
    generate, based on the evaluation results, an operation evaluation result for each of the one or more groups; and
    generate a list of operation evaluation results of the one or more groups.

13. The information collection device according to claim 1, wherein the circuitry is configured to:
    accumulate, in the database, grouping information for grouping the plurality of processes into one or more groups each of which include two or more processes;
    extract, based on the grouping information, two or more signal sets for each of the one or more groups;

generate evaluation results of the two or more processes based on the two or more signal sets for each of the one or more groups;
accumulate the evaluation results in the database; and
generate a list of the evaluation results of the one or more groups.

14. The information collection device according to claim 1, wherein the circuitry is configured to:
accumulate, in the database, workpiece information on one or more workpieces each of which is produced by the local device during execution of two or more processes of the plurality of processes;
extract, based on the workpiece information, two or more signal sets for each of the one or more work pieces;
generate evaluation results of the two or more processes based on the two or more signal sets for each of the one or more workpieces; and
accumulate the evaluation results in the database.

15. The information collection device according to claim 14, wherein the circuitry is configured to:
accumulate, in the database, a quality inspection result of the one or more workpieces; and
generate an association between the quality inspection result and the evaluation results for each of the one or more workpieces.

16. The information collection device according to claim 1, wherein the circuitry is configured to:
accumulate, in the database, job information on one or more job programs each of which is for operating the local device to execute two or more processes of the plurality of processes;
extract, based on the job information, two or more signal sets for each of the one or more job programs;
generate evaluation results of the two or more processes based on the two or more signal sets for each of the one or more job programs; and
accumulate the evaluation results in the database.

17. An information collection method comprising:
accumulating, in a database, a control signal of a local device having a motor, the local device being a part of a production system of one or more workpieces, the control signal including internal information of the local device generated during operation of a plurality of processes;
accumulating, in the database, program information on a program for operating the local device to execute the plurality of processes;
identifying a part of the program corresponding to one process of the plurality of processes based on a predetermined extraction condition and the program information;
extracting, from the control signal accumulated in the database, a signal set that is accumulated during the one process of the plurality of processes and associated with the part of the program in the database; and
generating an evaluation result of the one process based on the signal set.

18. The information collection method according to claim 17, further comprising:
selecting, based on the extraction condition, one of a plurality of evaluation engines having different criterions, each of the plurality of evaluation engines being configured to output the evaluation result in response to input of the signal set according to a criterion; and
generating the evaluation result based on the signal set and the selected evaluation engine.

19. A non-transitory memory device having instructions stored thereon that, in response to execution by a processing device, cause the processing device to perform operations comprising:
accumulating, in a database, a control signal of a local device having a motor, the local device being a part of a production system of one or more workpieces, the control signal including internal information of the local device generated during operation of a plurality of processes;
accumulating, in the database, program information on a program for operating the local device to execute the plurality of processes;
identifying a part of the program corresponding to one process of the plurality of processes based on a predetermined extraction condition and the program information;
extracting, from the control signal accumulated in the database, a signal set that is accumulated during the one process of the plurality of processes and associated with the part of the program in the database; and
generating an evaluation result of the one process based on the signal set.

20. The non-transitory memory device according to claim 19, wherein the operations further comprise:
selecting, based on the extraction condition, one of a plurality of evaluation engines having different criterions, each of the plurality of evaluation engines being configured to output the evaluation result in response to input of the signal set according to a criterion; and
generating the evaluation result based on the signal set and the selected evaluation engine.

* * * * *